United States Patent
Omori et al.

(10) Patent No.: US 7,110,244 B2
(45) Date of Patent: Sep. 19, 2006

(54) PRODUCTION PROCESS FOR NIOBIUM CAPACITOR

(75) Inventors: Kazuhiro Omori, Kanagawa (JP); Kazumi Naito, Chiba (JP); Hirofumi Fukunaga, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/474,311

(22) PCT Filed: Apr. 10, 2002

(86) PCT No.: PCT/JP02/03574

§ 371 (c)(1),
(2), (4) Date: Oct. 7, 2003

(87) PCT Pub. No.: WO02/084687

PCT Pub. Date: Oct. 24, 2002

(65) Prior Publication Data

US 2004/0111849 A1    Jun. 17, 2004

Related U.S. Application Data

(60) Provisional application No. 60/284,207, filed on Apr. 18, 2001.

(30) Foreign Application Priority Data

Apr. 12, 2001  (JP) .......................... 2001-113391

(51) Int. Cl.
*H01G 4/06* (2006.01)
*H01G 5/013* (2006.01)
*H01G 9/04* (2006.01)

(52) U.S. Cl. .................. 361/524; 361/528; 29/25.03
(58) Field of Classification Search ........ 361/523–541; 29/25.03
See application file for complete search history.

(56) References Cited

U.S. PATENT DOCUMENTS

| | | | | |
|---|---|---|---|---|
| 3,653,119 A | * | 4/1972 | Fresia et al. ................. 427/80 |
| 4,090,288 A | * | 5/1978 | Thompson et al. ......... 29/25.03 |
| 4,110,816 A | * | 8/1978 | Deckert et al. ............. 361/535 |
| 5,781,401 A | * | 7/1998 | Tomiyasu et al. ........... 361/303 |
| 5,812,367 A | * | 9/1998 | Kudoh et al. ............... 361/523 |
| 5,850,332 A | * | 12/1998 | Kunieda et al. ............ 361/523 |
| 6,115,235 A | | 9/2000 | Naito |
| 6,426,866 B1 | * | 7/2002 | Shoji et al. ................. 361/523 |
| 6,614,063 B1 | * | 9/2003 | Hayashi et al. ............. 257/213 |

FOREIGN PATENT DOCUMENTS

| | | |
|---|---|---|
| JP | 64-013714 A | 1/1989 |
| JP | 07-27851 | 3/1995 |
| JP | 9-293638 * | 11/1997 |
| JP | 10-242004 | 9/1998 |
| JP | 2000-182899 A | 6/2000 |
| SU | 871243 * | 10/1981 |

OTHER PUBLICATIONS

Palatnik et al., "Effect of heat treatment on the structure of anodic niobium oxide films"1978, Fizika i Khimiya Obrabotki Materialov, pp 109-114.*
Schnitter et al, "New Nioblum Based Materials for Solid Electrolytic Capacitors", no date.*
International Search Report for PCT/JP02/03574 dated Jul. 16, 2002.
International Preliminary Examination Report for PCT/JP02/03574 dated Jun. 9, 2003.
Korean Office Action dated Jul. 27, 2005.

* cited by examiner

*Primary Examiner*—Eric W. Thomas
(74) *Attorney, Agent, or Firm*—Sughrue Mion, PLLC

(57) ABSTRACT

A process for producing a niobium capacitor, including a step of exposing the dielectric oxide layer to a temperature of 100 to 1,400° C. is disclosed. A capacitor obtained by the production process of the present invention has excellent LC properties, and the reduction in the capacitance due to application of DC bias is small.

16 Claims, No Drawings

PRODUCTION PROCESS FOR NIOBIUM CAPACITOR

CROSS-REFERENCE TO RELATED APPLICATIONS

This application is based on the provisions of 35 U.S.C. Article 111(a) with claiming the benefit of filing dates of U.S. provisional application Serial No. 60/284,207 filed on☐Apr. 18, 2001, under the provisions of 35 U.S.C. 111(b), pursuant to 35 U.S.C. Article 119(e)(1).

TECHNICAL FIELD

The present invention relates to a production process for a niobium capacitor. More specifically, the present invention relates to a production process for a niobium solid electrolytic capacitor improved in the high-temperature life characteristics, reduced in the bias change, and having a large capacitance per unit weight and a small leakage current (hereinafter sometimes simply referred to as "LC").

BACKGROUND ART

Capacitors for use in electronic instruments such as portable telephone and personal computer are demanded to have a small size and a large capacitance. Among these capacitors, tantalum capacitors are preferred because of their large capacitance for the size and good performance. For the dielectric material of tantalum electrolytic capacitors, tantalum oxide is usually used but in order to more increase the capacitance, studies are being made on niobium electrolytic capacitors using niobium oxide having a higher dielectric constant for the dielectric material. The present inventor has previously revealed that among niobium electrolytic capacitors, electrolytic capacitors using a partially nitrided niobium sintered body for the electrode have a large capacitance and good LC characteristics (see, JP-A-10-242004 (U.S. Pat. No. 6,115,235) (the term "JP-A" as used herein means an "unexamined published Japanese patent application")).

The capacitor manufactured using a partially nitrided niobium sintered body disclosed in this patent publication has a large capacitance and good LC characteristics but undergoes great reduction in the capacitance due to application of DC bias. Accordingly, for obtaining a capacitor having a desired capacitance, it is necessary to use the sintered body in a large amount or produce a sintered body using niobium powder having a smaller particle size.

Accordingly, the object of the present invention is to provide a capacitor having good LC characteristics and undergoing less reduction in the capacitance due to application of DC bias, and a production process therefor.

The reduction in the capacitance due to application of DC bias is a property peculiar to niobium and this is presumed to occur because the niobium oxide as a main component of the dielectric layer is unstable.

DISCLOSURE OF THE INVENTION

As a result of extensive investigations on the above-described problem, the present inventors have found that the niobium oxide as a main component of the dielectric layer can be stabilized by exposing it to heat. The present invention has been accomplished based on this finding.

The present invention provides a process for producing a niobium capacitor, a capacitor produced by the process, an electronic circuit and electronic instrument using the capacitor as follows:

(1) A process for producing a niobium capacitor, comprising a step of exposing the dielectric oxide layer to a temperature of 100 to 1,400° C. as any one of steps before jacket-molding;

(2) A process for producing a niobium capacitor comprising a step of forming an oxide film on the surface of the niobium sintered body, a semiconductor layer on the oxide film, and an electrically conducting layer on the semiconductor layer and jacket-molding, wherein the sintered body which has an oxide layer formed on the surface is exposed to a temperature of 100 to 1,400° C. before formation of a semiconductor layer on the oxide layer;

(3) A process for producing a niobium capacitor comprising a step of forming an oxide film on the surface of the niobium sintered body, a semiconductor layer on the oxide film, and an electrically conducting layer on the semiconductor layer, and jacket-molding, wherein the sintered body which has an oxide film formed on the surface and an organic semiconductor layer formed on the oxide film is exposed to a temperature of 100 to 350° C. before formation of an electrically conducting layer on the semiconductor layer;

(4) A process for producing a niobium capacitor comprising a step of forming an oxide film on the surface of the niobium sintered body, a semiconductor layer on the oxide film and an electrically conducting layer on the semiconductor layer and jacket-molding, wherein the sintered body which has an oxide film formed on the surface, an organic semiconductor layer formed on the oxide film☐and☐an electrically conducting layer formed on the organic semiconductor layer is exposed to a temperature of 100 to 300° C. before jacket-molding with a resin;

(5) the production process for a niobium capacitor as described in any one of (1) to (4) above, wherein the niobium sintered body contains one or more other elements in an amount of 50 to 400,000 mass ppm;

(6) the production process for a niobium capacitor as described in any one of (1) to (5) above, wherein the niobium sintered body is a niobium alloy sintered body which contains one or more other elements selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, carbon, silicon, germanium, tin, lead, phosphorus, arsenic, antimony, bismuth, selenium, tellurium, polonium and astatine in a total amount of 50 to 400,000 mass ppm;

(7) the production process for a niobium capacitor as described in any one of (1) to (6) above, wherein the niobium sintered body contains one or more other elements selected from the group consisting of boron, nitrogen, carbon and sulfur in an amount of 50 to 200,000 mass ppm;

(8) a capacitor obtained by the production process described in any one of (1) to (7) above;

(9) an electronic circuit using the capacitor described in (8) above; and

(10) an electronic instrument using the capacitor described in (8) above.

DETAILED DESCRIPTION OF THE INVENTION

The production process for a niobium capacitor of the present invention is described below.

In the preparation of a niobium capacitor, a dielectric oxide film layer mainly comprising niobium oxide is formed on one electrode (the first electrode), and on this dielectric oxide layer, the other electrode (the counter electrode) is formed. Niobium or niobium alloy is preferably used for the first electrode to readily form the niobium oxide layer, and the sintered body of niobium or niobium alloy is more preferably used to obtain a larger capacitance.

For example, an oxide film layer mainly comprising niobium oxide is formed on a sintered body of niobium or niobium alloy (hereinafter referred to as "niobium sintered body" unless otherwise specified) by electrolytic formation, and on the outer side of this oxide film layer, an inorganic semiconductor layer such as lead dioxide and manganese dioxide or an organic semiconductor layer containing a dopant, such as polypyrrole, polythiophene and poly(3,4-ethylenedioxythiophene), is formed as a counter electrode. Subsequently, an electrically conducting layer is formed on this electrode by applying an electrically conducting paste such as carbon paste and silver paste for the purpose of reducing the contact resistance, to obtain a niobium capacitor device. The obtained niobium capacitor device is generally imparted with heat resistance or moisture resistance by forming a resin jacket from a polymer sealing material such as epoxy resin or phenol resin, to be put into practical use.

The production process for a niobium capacitor of the present invention is characterized by comprising a step of exposing the dielectric oxide film layer to a high temperature of 100 to 1,400° C. The exposure to a high temperature may be performed at any stage insofar as it is after the formation of the dielectric oxide film layer but the timing and the temperature therefor vary depending on the stability against heat of the construction material used for the semiconductor layer or electrically conducting layer. In the production of a niobium capacitor, polypyrrole or the like is preferably used for the organic semiconductor layer, and in such a case, the timing of exposing the sintered body having formed thereon the oxide film to heat is preferably after the formation of oxide film but before the formation of an organic semiconductor layer. The temperature to which the dielectric oxide film layer is exposed is preferably from the chemical forming temperature to the melting point of oxide film, for example, from 100 to 1,400° C., preferably from 150 to 1,200° C., and more preferably from 200 to 1,000° C. In the case of performing the heating after the formation of an organic semiconductor (before the formation of an electrically conducting layer), the temperature is preferably from 100 to 350° C., more preferably from 150 to 300° C.

In the case of performing the heating after the formation of an electrically conducting layer (before jacket-molding), the temperature is preferably from 100 to 300° C., more preferably higher than the curing temperature of resin used for jacketing but 270° C. or lower, for example, in the case where the curing temperature of the resin used is 140° C., the heating temperature is preferably within the range of 150 to 270° C. The reason why the heating temperature is set higher than the curing temperature of resin used for jacketing is presumed that the effect by the thermal stress at the molding with resin is mitigated and therefore generation of cracks inside the semiconductor layer and increase in the leakage current value can be prevented.

The atmosphere in exposing to a high temperature may be air or may be an inert gas atmosphere such as He, Ne or Ar. The exposure to a high temperature may be performed under any condition of reduced pressure, atmospheric pressure or applied pressure. Specifically, in the case where the heating temperature is 350° C.□or higher, the exposure is preferably performed in an inert gas atmosphere as above mentioned under a reduced pressure. In any case, the holding time at a high temperature is from several seconds to several tens of hours. After exposing the dielectric oxide film layer to heat, electrolytic oxidation may be further performed to stabilize the dielectric oxide film layer.

The niobium sintered body for use in the present invention is described below.

The niobium sintered body may be the niobium alloy sintered body, and may be sufficient if a dielectric oxide film layer mainly comprising niobium oxide can be formed.

For example, a niobium simple substance can be of course suitably used as the niobium sintered body but a part of the niobium sintered body may be treated by at least one method of nitridation, boronization, carbonization and sulfidization. The bonded amount, namely, the sum total of nitrogen, boron, carbon and sulfur contents varies depending on the particle size of fine powder used in the manufacture of sintered body, the specific surface area of sintered body or the shape of sintered body, but is from 50 to 200,000 mass ppm, preferably from 200 to 20,000 mass ppm.

The another part alloy component of the niobium alloy sintered body is at least one selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, carbon, silicon, germanium, tin, lead, phosphorus, arsenic, antimony, bismuth, selenium, tellurium, polonium and astatine. The total content thereof is preferably from 50 to 400,000 mass ppm, and in view of LC characteristics, more preferably from 100 to 50,000 mass ppm, though this may vary depending on the element contained. A part of this niobium alloy sintered body may be nitrided, boronized, carbonized or sulfidized. The bonded amount thereof, namely, the sum total of nitrogen, boron, carbon and sulfur contents is from 50 to 20,000 mass ppm, preferably from 200 to 5,000 mass ppm, though this may vary depending on the other part alloy component or its content.

The dielectric oxide film layer formed on the surface of the niobium sintered body may be an oxide layer of the sintered body itself provided on the surface layer portion of the sintered body or may be another dielectric oxide layer provided on the surface of the sintered body, but is preferably a layer containing the oxide of the niobium sintered body, more preferably an oxide layer mainly comprising niobium oxide. In any case, the oxide layer may be provided by a conventionally known method. For example, in the case of forming a dielectric material mainly comprising niobium oxide by electrolytic oxidation (also referred to as "electrolytic formation" or simply as "formation"), this may be attained by performing electrochemical forming in an aqueous 0.1% phosphoric acid solution as described in JP-A-2000-182899 (European Patent Publication No.1158552).

The composition and the formation method of a semiconductor layer for use in the present invention are not particularly limited, but at least one compound selected from electrolytic solutions, organic semiconductors and inorganic semiconductors known in the art of aluminum electrolytic capacitor may be used.

Specific examples of the electrolytic solution include a dimethylformamide and ethylene glycol mixed solution having dissolved therein 5 mass % of isobutyltripropylammonium borotetrafluoride electrolyte, and a propylene carbonate and ethylene glycol mixed solution having dissolved therein 7 wt % of tetraethylammonium borotetrafluoride.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by the following formula (1) or (2)

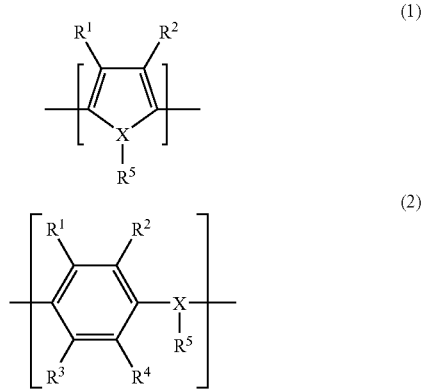

(wherein $R^1$ to $R^4$, which may be the same or different, each represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or the hydrocarbon chains of $R^3$ and $R^4$ may combine with each other at any position to form a divalent chain for forming at least one 3-, 4-, 5-, 6- or 7-membered saturated or unsaturated hydrocarbon cyclic structure together with the carbon atoms to which those groups are substituted;

the cyclic bonded chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a linear or branched, saturated or unsaturated alkyl group having from 1 to 10 carbon atoms. Among these, polypyrrole and poly (3,4-ethylenedioxythiophene) are preferred.

Examples of the inorganic semiconductor include an inorganic semiconductor mainly comprising lead dioxide or manganese dioxide, and an inorganic semiconductor comprising triiron tetroxide. These semiconductors may be used individually or in combination of two or more thereof.

In the case where the other part electrode is solid, for example, electrically conducting pastes such as carbon paste and silver paste are sequentially laminated on the other part electrode to form an electrically conducting layer. One or more conventionally known electrically conducting pastes can be used as the electrically conducting paste for use in the present invention.

The subsequent resin jacketing is performed using a known polymer resin such as epoxy resin or phenol resin by a known method such as dipping, casting, molding, potting or powder painting.

INDUSTRIAL APPLICABILITY OF THE INVENTION

In the capacitor manufactured as such by the operation of forming a dielectric oxide film layer on the niobium sintered body or niobium alloy sintered body and then exposing the dielectric oxide film layer to a temperature of 100 to 1,400° C., the dielectric oxide film layer is stabilized and the change in capacitance due to application of DC bias is small, so that a highly reliable capacitor having a small LC value and high heat resistance can be obtained. Furthermore, when the capacitor of the present invention is used, a more compact capacitor product can be obtained as compared with conventional capacitors having the same capacitance.

The capacitor of the present invention having such characteristics is applicable to uses as a bypass capacitor or a coupling capacitor often used in analog circuit and digital circuit, and also to uses of conventional tantalum capacitor.

In general, such a capacitor is often used in an electronic circuit and when the capacitor of the present invention is used, the restriction on the arrangement of electronic parts or on the discharge of heat is reduced and a highly reliable electronic circuit can be housed in a narrower space.

Furthermore, when the capacitor of the present invention is used, a more compact electronic instrument having higher reliability can be obtained, for example, computer, computer peripheral equipment such as PC card, mobile instrument such as portable telephone, home appliance, car instrument, artificial satellite and communication equipment.

BEST MODE FOR CARRYING OUT THE INVENTION

The present invention is described in greater detail below by referring to Examples, however, the present invention is not limited to these Examples.

In each Example, the capacitance and leakage current value of a capacitor worked into a chip were measured by the following methods.

(1) Measurement of Capacitance of Capacitor

At room temperature, an LCR meter manufactured by Hewlett-Packard Company (Precision LCR Meter Model HP4284A) was connected between terminals of the manufactured chip and the capacitance when a DC bias of 1.5 V was applied at 120 Hz was used as the capacitance of a capacitor worked into a chip. For more clearly show the improvement in the performance against application of DC bias, the rate of change in CV as represented by the following formula was designated as a "CV residual ratio".

$CV$ residual ratio (%)=($CV$ value when $DC$ bias of 1.5 V is applied/$CV$ value when $DC$ bias is not applied)×100

(2) Measurement of Leakage Current of Capacitor

Out of rated voltage values (2.5 V, 4 V, 6.3 V, 10 V, 16 V, 25 V), a direct current voltage (6.3 V) close to about ⅓ to about ¼ of the chemical forming voltage (direct current, 20 V) at the manufacture of dielectric material was continuously applied between terminals of the manufactured chip for 1 minute at room temperature and thereafter, the current value was measured. This current value was used as the leakage current value of a capacitor worked into a chip.

EXAMPLE 1

In an SUS304-made container, 100 g of niobium ingot was placed. Thereinto, hydrogen was continuously introduced at 400° C. for 10 hours. After cooling, the hydrogenated niobium lump was placed in an SUS304-made pot containing SUS-made balls and ground for 10 hours. This hydrogenated product was formed into a 20 vol % slurry with water and the obtained slurry was placed together with zirconia balls in an SUS304-made spike mill and wet-ground at 10° C. or less for 7 hours. This slurry was centrifuged and decanted to obtain a pulverized matter. The pulverized matter was dried under the conditions of $1.33 \times 10^2$ Pa and 50° C. Subsequently, the hydrogenated niobium powder was dehydrogenated under heating at $1.33 \times 10^{-2}$ Pa and 400° C. for 1 hour. The produced niobium powder had an average particle size of 0.8 μm. The obtained niobium powder was granulated at 1,000° C. under a reduced pressure of $4 \times 10^{-3}$ Pa. Thereafter, the granulated lump was cracked to obtain a niobium granulated powder having an average particle size of 100 μm and this powder was nitrided under heating at 300° C. for 4 hours in a nitrogen stream.

The thus-obtained niobium granulated powder was molded together with 0.3 mmφ niobium wire to manufacture a compact (about 0.1 g) of approximately 0.3 cm×0.18 cm×0.45 cm.

By allowing this compact to stand at 1,200° C. for 30 minutes under a reduced pressure of $4 \times 10^{-3}$ Pa, a sintered body was obtained. The sintered body obtained was electrochemically formed in an aqueous 0.1% phosphoric acid solution at a temperature of 800° C. for 1,000 minutes with a voltage of 20 V, as a result, a dielectric oxide film layer was formed on the surface.

Then, the sintered body on which surface the dielectric layer was formed was exposed to a temperature of 285° C. for 30 minutes in an air under atmospheric pressure. After cooling to room temperature, the sintered body was further electrochemically formed in an aqueous 0.1% phosphoric acid solution at 80° C. for 200 minutes with a voltage of 20 V. Subsequently, an operation of contacting the dielectric oxide film layer with an equivalent mixed solution of an aqueous 10% ammonium persulfate solution and an aqueous 0.5% anthraquinonesulfonic acid solution and then with a pyrrole vapor was performed at least 5 times, whereby an organic semiconductor layer comprising polypyrrole was formed.

On the organic semiconductor layer, a carbon paste layer and a silver paste layer were sequentially laminated. The obtained device was placed on a lead frame and jacket-molded by performing powder painting 5 times at 155° C. using powder epoxy resin PCE273 produced by Nitto Pernox and then curing the resin at 155° C. for 2 hours. Thus, a chip-type capacitor was manufactured. The average capacitance and average LC value of this capacitor (n=100 units) are shown in Table 1. The LC value is a value when 6.3 V was applied for 1 minute.

EXAMPLES 2 TO 5

Niobium alloy sintered bodies starting from a niobium alloy ingot having various alloy species shown in Table 1 were obtained in the same manner as in Example 1. After a dielectric oxide film was formed, each sintered body was exposed to a temperature shown in Table 1 and then, an organic semiconductor layer and an electrically conducting layer were formed to manufacture a chip-type capacitor. The average capacitance and average LC value of each capacitor (n=100 units) are shown in Table 1. The LC value is a value when 6.3 V was applied for 1 minute.

EXAMPLE 6

A niobium zinc alloy powder having an average particle size of 0.8 μm was obtained starting from a niobium zinc alloy containing 1,000 mass ppm of zinc by performing hydrogenation, pulverization and dehydrogenation in the same manner as in Example 1. The obtained niobium zinc alloy powder was granulated at 1,150° C. under a reduced pressure of $4 \times 10^{-3}$ Pa. Thereafter, the granulated lump was cracked to obtain a niobium granulated powder having an average particle size of 120 μm.

The thus-obtained niobium zinc granulated powder was molded together with a 0.3 mmφ niobium wire to manufacture a compact (about 0.1 g) of approximately 0.3 cm×0.18 cm×0.45 cm.

By allowing this compact to stand at 1,250° C. for 30 minutes under a reduced pressure of $4 \times 10^{-3}$ Pa, a sintered body was obtained. The sintered body obtained was electrochemically formed in an aqueous 0.1% phosphoric acid solution at a temperature of 80° C. for 1,000 minutes with a voltage of 20 V, as a result, a dielectric oxide film layer was formed on the surface.

Then, the sintered body on which surface the dielectric layer was formed was exposed to a temperature of 500° C. for 30 minutes in an air under a reduced pressure of $4 \times 10^{-3}$ Pa. After cooling to room temperature, the sintered body was dipped in an aqueous solution containing 25 mass % of ammonium persulfate (Solution 1), pulled out, dried at 80° C. for 30 minutes, dipped in an isopropanol solution containing 18 mass % of 3,4-ethylenedioxythiophene (Solution 2), pulled out and allowed to stand in an atmosphere of 100° C. for 10 minutes to perform the oxidation polymerization. The sintered body was again dipped in Solution 1 and then treated in the same manner as above. The operation from dipping in Solution 1 until performing the oxidation polymerization was repeated 8 times and thereafter, the sintered body was washed with warm water at 50° C. for 10 minutes and dried at 100° C. for 30 minutes, thereby forming an organic semiconductor layer comprising poly(3,4-ethylenedioxythiophene).

On the organic semiconductor layer, a carbon paste layer and a silver paste layer were sequentially laminated. The obtained device was placed on a lead frame and jacket-molded by performing dipping once with epoxy resin XNR1213 produced by Nippon Ciba Geigy and then curing the resin at 150° C. for 2 hours. Thus, a chip-type capacitor was manufactured. The average capacitance and average LC value of this capacitor (n=50 units) are shown in Table 1. The LC value is a value when 6.3 V was applied for 1 minute.

EXAMPLES 7 AND 8

Niobium alloy sintered bodies starting from a niobium alloy ingot having various alloy species shown in Table 1 were obtained in the same manner as in Example 6. After a dielectric oxide film was formed, each sintered body was exposed to a temperature and an atmosphere shown in Table 1 and then, an organic semiconductor layer and an electrically conducting layer were formed to manufacture a chip-type capacitor. The average capacitance and average LC value of each capacitor (n=100 units) are shown in Table 1. The LC value is a value when 6.3 V was applied for 1 minute.

EXAMPLE 9

A niobium antimony alloy powder having an average particle size of 0.8 μm was obtained starting from a niobium antimony alloy containing 10,000 mass ppm of antimony by performing hydrogenation, pulverization and dehydrogenation in the same manner as in Example 1. The obtained niobium antimony alloy powder was granulated at 1,100° C. under a reduced pressure of $4\times10^{-3}$ Pa. Thereafter, the granulated lump was cracked to obtain a niobium antimony granulated powder having an average particle size of 95 μm.

The thus-obtained niobium antimony granulated powder was molded together with a 0.3 mmφ niobium wire to manufacture a compact (about 0.1 g) of approximately 0.3 cm×0.18 cm×0.45 cm. By allowing this compact to stand at 1,250° C. for 30 minutes under a reduced pressure of $4\times10^{-3}$ Pa, a sintered body was obtained. The sintered body obtained was electrochemically formed in an aqueous 0.1% phosphoric acid solution at a temperature of 80° C. for 1,000 minutes with a voltage of 20 V, as a result, a dielectric oxide film layer was formed on the surface.

Thereafter, an operation of dipping the sintered body in an aqueous 60% manganese nitrate solution and then heating it at 190° C. for 120 minutes was repeated to form a manganese dioxide layer as a semiconductor layer on the dielectric oxide film. Subsequently, the sintered body was exposed to a temperature of 400° C. for 30 minutes in an Ar atmosphere. After cooling to room temperature, a carbon paste layer and a silver paste layer were sequentially laminated on the semiconductor layer. The obtained device was placed on a lead frame and jacket-molded by performing transfer molding using epoxy resin MP series produced by Nitto Electric Industrial Co., Ltd. and then curing the resin at 190° C. for 30 minutes. Thus, a chip-type capacitor was manufactured. The average capacitance and average LC value of this chip-type capacitor (n=100 units) are shown in Table 1. The LC value is a value when 6.3 V was applied for 1 minute.

EXAMPLES 10 AND 11

In Example 10, a niobium sintered body was obtained in the same manner as in Example 1. In Example 11, a niobium zirconium gallium alloy sintered body was obtained in the same manner as in Example 2. After a dielectric oxide film was formed, a semiconductor layer was formed in the same manner as in Example 9. Thereafter, each sintered body was exposed to a temperature shown in Table 1 and then, an electrically conducting layer was formed to manufacture a chip-type capacitor. The average capacitance and average LC value of each capacitor (n=100 units) are shown in Table 1. The LC value is a value when 6.3 V was applied for 1 minute.

COMPARATIVE EXAMPLES 1 TO 3

The sintered bodies having formed thereon a dielectric oxide film layer, obtained in Examples 1, 6 and 9 were used in Comparative Examples 1, 2 and 3, respectively. Chip-type capacitors were manufactured without exposing each sintered body to heat by sequentially performing the formation of a semiconductor layer and an electrically conducting layer and the jacket-molding with epoxy resin in the same manner as in respective Examples. The average capacitance and average LC value of each capacitor (n=100 units) are shown in Table 1. The LC value is a value when 6.3 V was applied for 1 minute

TABLE 1

| | Species of Sintered Body | Other Component | Content of Other Component (ppm) | Atmosphere Exposed | Temperature Exposed (° C.) | Time Exposed (hr) | CV (μF/units) | LC (μA/units) | CV Residual Ratio (%) |
|---|---|---|---|---|---|---|---|---|---|
| Example 1 | Nb | Nitrogen | 2500 | in air | 285 | 0.5 | 530 | 3.2 | 99.2 |
| Example 2 | Nb—B alloy | Boron nitrogen | 2500 500 | in air | 300 | 1.0 | 589 | 1.4 | 99.5 |
| Example 3 | Nb—W alloy | Tungsten nitrogen | 18000 700 | in air | 325 | 0.5 | 612 | 1.7 | 99.7 |
| Example 4 | Nb—Si alloy | Silicon nitrogen | 50000 3500 | in air | 270 | 1.5 | 498 | 3.9 | 99.1 |
| Example 5 | Nb—Al—Zr alloy | Aluminum zirconium nitrogen | 3900 5000 300 | in air | 315 | 2.0 | 594 | 1.7 | 99.3 |
| Example 6 | Nb—Zn alloy | Zinc | 1000 | in reduced pressure | 500 | 0.5 | 561 | 1.5 | 99.2 |
| Example 7 | Nb—Nd alloy | Neodymium | 9800 | in reduced pressure | 900 | 0.5 | 540 | 2.4 | 99.5 |
| Example 8 | Nb—Ti—Te alloy | Titanium tellurium | 500 5000 | in reduced pressure | 450 | 0.5 | 572 | 3.0 | 99.4 |
| Example 9 | Nb—Sb alloy | Antimony nitrogen | 10000 400 | in Ar atmosphere | 400 | 0.5 | 540 | 2.2 | 99.1 |
| Example 10 | Nb | Nitrogen | 4200 | in Ar atmosphere | 350 | 3.0 | 520 | 3.2 | 99.3 |
| Example 11 | Nb—Zr—Ga alloy | Zirconium gallium nitrogen | 11000 1000 500 | in Ar atmosphere | 250 | 1.0 | 620 | 1.6 | 99.7 |

TABLE 1-continued

| | Species of Sintered Body | Other Component | Content of Other Component (ppm) | Atmosphere Exposed | Temperature Exposed (° C.) | Time Exposed (hr) | CV (μF/units) | LC (μA/units) | CV Residual Ratio (%) |
|---|---|---|---|---|---|---|---|---|---|
| Comparative Example 1 | Nb | Nitrogen | 2500 | — | — | — | 466 | 33.9 | 87.9 |
| Comparative Example 2 | Nb—Zn alloy | Zinc | 1000 | — | — | — | 487 | 21.2 | 86.5 |
| Comparative Example 3 | Nb—Sb alloy | Antimony nitrogen | 10000 400 | — | — | — | 488 | 29.1 | 90.5 |

The invention claimed is:

1. A process for producing a niobium capacitor comprising a step of forming an oxide film on the surface of a niobium sintered body, a semiconductor layer on the oxide film, and an electrically conducting layer on the semiconductor layer and jacket-molding, wherein the sintered body which has an oxide layer formed on the surface is exposed to a temperature of 100 to 1,400° C. in an inert gas atmosphere before formation of the semiconductor layer on the oxide layer.

2. The production process for a niobium capacitor as claimed in claim 1, wherein the niobium sintered body contains one or more other elements in an amount of 50 to 400,000 mass ppm.

3. The production process for a niobium capacitor as claimed in claim 1, wherein the niobium sintered body is niobium alloy sintered body which contains one or more other elements selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, carbon, silicon, germanium, tin, lead, phosphorus, arsenic, antimony, bismuth, selenium, tellurium, polonium and astatine in a total amount of 50 to 400,000 mass ppm as alloy component(s).

4. The production process for a niobium capacitor as claimed in claim 1, wherein the niobium sintered body contains one or more other elements selected from the group consisting of boron, nitrogen, carbon and sulfur in an amount of 50 to 200,000 mass ppm.

5. A capacitor obtained by the production process as claimed in claim 1.

6. An electronic circuit using the capacitor as claimed in claim 5.

7. An electronic instrument using the capacitor as claimed in claim 5.

8. The production process as claimed in claim 1, wherein the inert gas is selected from the group consisting of He, Ne and Ar.

9. A process for producing a niobium capacitor comprising a step of forming an oxide film on the surface of a niobium sintered body, an organic semiconductor layer on the oxide film and an electrically conducting layer on the semiconductor layer, and jacket-molding with a resin, wherein the sintered body which has an oxide film formed on the surface, the semiconductor layer formed on the oxide film and an electrically conducting layer formed on the organic semiconductor layer is exposed to a temperature range of from a curing temperature of the resin used for jacket-molding to 300° C. before jacket-molding in an inert gas atmosphere with the resin.

10. The production process for a niobium capacitor as claimed in claim 9, wherein the niobium sintered body contains one or more other elements in an amount of 50 to 400,000 mass ppm.

11. The production process for a niobium capacitor as claimed in claim 9, wherein the niobium sintered body is niobium alloy sintered body which contains one or more other elements selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, boron, aluminum, gallium, indium, thallium, carbon, silicon, germanium, tin, lead, phosphorus, arsenic, antimony, bismuth, selenium, tellurium, polonium and astatine in a total amount of 50 to 400,000 mass ppm as alloy component(s).

12. The production process for a niobium capacitor as claimed in claim 9, wherein the niobium sintered body contains one or more other elements selected from the group consisting of boron, nitrogen, carbon and sulfur in an amount of 50 to 200,000 mass ppm.

13. A capacitor obtained by the production process as claimed in claim 9.

14. An electronic circuit comprising the capacitor as claimed in claim 13.

15. An electronic instrument comprising the capacitor as claimed in claim 13.

16. A process for producing a niobium capacitor comprising a step of forming an oxide film on the surface of a niobium sintered body, an organic semiconductor layer on the oxide film and an electrically conducting layer on the semiconductor layer, and jacket-molding with a resin; which process comprises exposing the sintered body which has an oxide film formed on the surface, the semiconductor layer formed on the oxide film and electrically conducting layer formed on the organic semiconductor layer to a temperature range of from a curing temperature of the resin used for jacket-molding to 300° C. in an inert gas atmosphere before jacket-molding with the resin.

* * * * *